Figure 1:
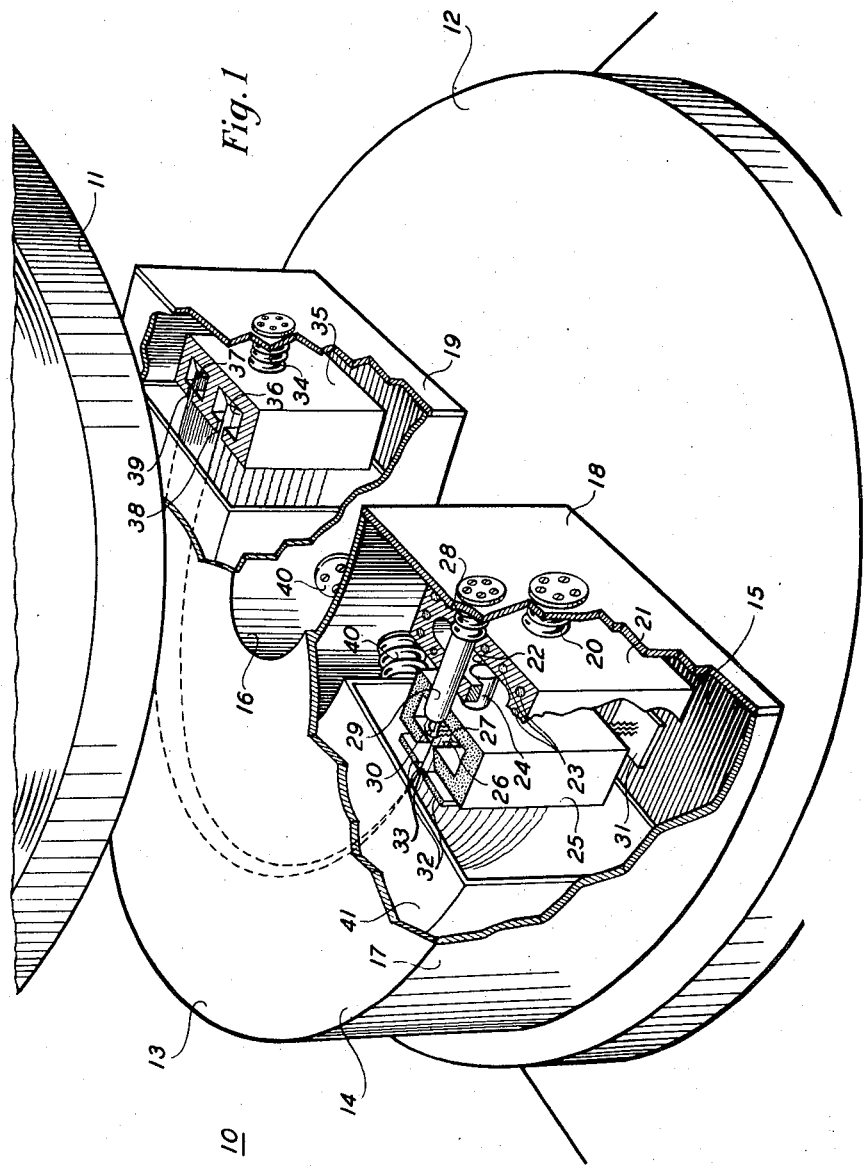

Oct. 14, 1958   J. M. CARTER ET AL   2,856,263
PROCESS FOR THE RECOVERY AND PURIFICATION
OF URANIUM DEPOSITS
Original Filed April 21, 1944   7 Sheets-Sheet 1

INVENTORS
James M. Carter
Martin D. Kamen
BY
ATTORNEY

INVENTORS
James M. Carter
Martin D. Kamen
BY
ATTORNEY

United States Patent Office 2,856,263
Patented Oct. 14, 1958

2,856,263

PROCESS FOR THE RECOVERY AND PURIFICATION OF URANIUM DEPOSITS

James M. Carter, Los Angeles, and Martin D. Kamen, Berkeley, Calif., assignors to the United States of America as represented by the United States Atomic Energy Commission Original application April 21, 1944, Serial No. 532,159. Divided and this application April 26, 1945, Serial No. 590,434

9 Claims. (Cl. 23—14.5)

The present invention relates to processes of producing an element enriched with a selected isotope, and more particularly uranium enriched with $U^{235}$. This application is a division of our copending application, Serial No. 532,159, filed April 21, 1944, now Patent No. 2,758,006, issued August 7, 1956.

It is an object of the invention to provide a process of increasing the proportion of a selected isotope in an element containing a plurality of isotopes that can be carried out on a large scale to produce quantities of the elements thus enriched for commercial use.

Another object of the invention is to provide a process of producing an element enriched with a selected isotope, which process utilizes a calutron for the purpose of obtaining the enrichment.

Another object of the invention is to provide a process of producing an element enriched with a selected isotope, which process utilizes first-stage and second-stage calutrons arranged in tandem for the purpose mentioned.

A further object of the invention is to provide a process of recovering the residue of a material which has been subjected to treatment in a calutron from the parts of the calutron disposed in the source region thereof upon which the residue is deposited.

A further object of the invention is to provide a process of recovering an element enriched with a selected isotope from the collector of a calutron upon which the enriched element is deposited.

A further object of the invention is to provide a process of treating the residue of a material which has been previously treated in a calutron in order to render the material suitable to be retreated in the calutron.

A further object of the invention is to provide a process of treating material which has been enriched with a selected isotope in a first-stage calutron in order to render the material suitable to be further enriched with the selected isotope in a second-stage calutron.

A further object of the invention is to provide a process of purifying material which has been treated in first-stage and second-stage calutrons arranged in tandem in order to render the material suitable for commercial use.

A further object of the invention is to provide a process of treating an element which has been impoverished with respect to a selected isotope by treatment in a second-stage calutron in order to render the material suitable to be retreated in a first-stage calutron in order again to enrich the element with respect to the selected isotope.

A further object of the invention is to provide a process of producing uranium enriched with $U^{235}$, which process utilizes a calutron in which a halide of uranium is treated.

A further object of the invention is to provide a process of producing uranium enriched with $U^{235}$, which process utilizes first-stage and second-stage calutrons in which the compound $UCl_4$ is treated.

A still further object of the invention is to provide a process of recovering, reclaiming, purifying and converting uranium both in metallic and compound forms in conjunction with the calutron method of enriching the uranium with $U^{235}$, whereby minimum handling of the uranium and maximum efficiency of the process are obtained.

Figure 2:
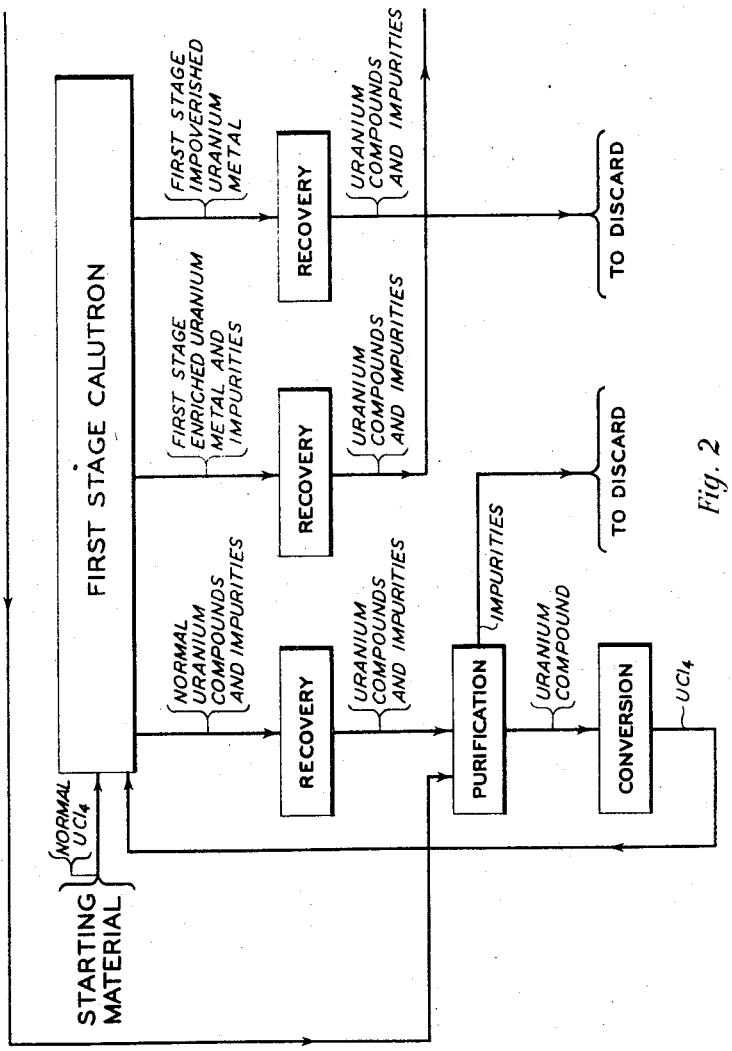
Figure 3:
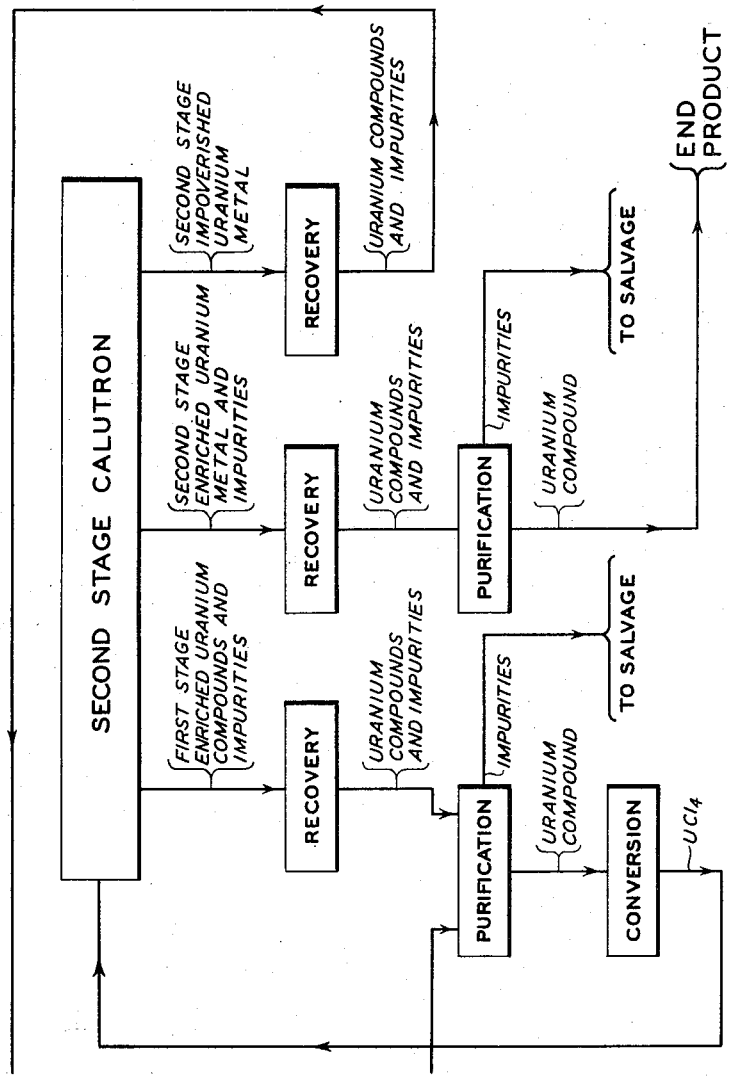
Figure 4:
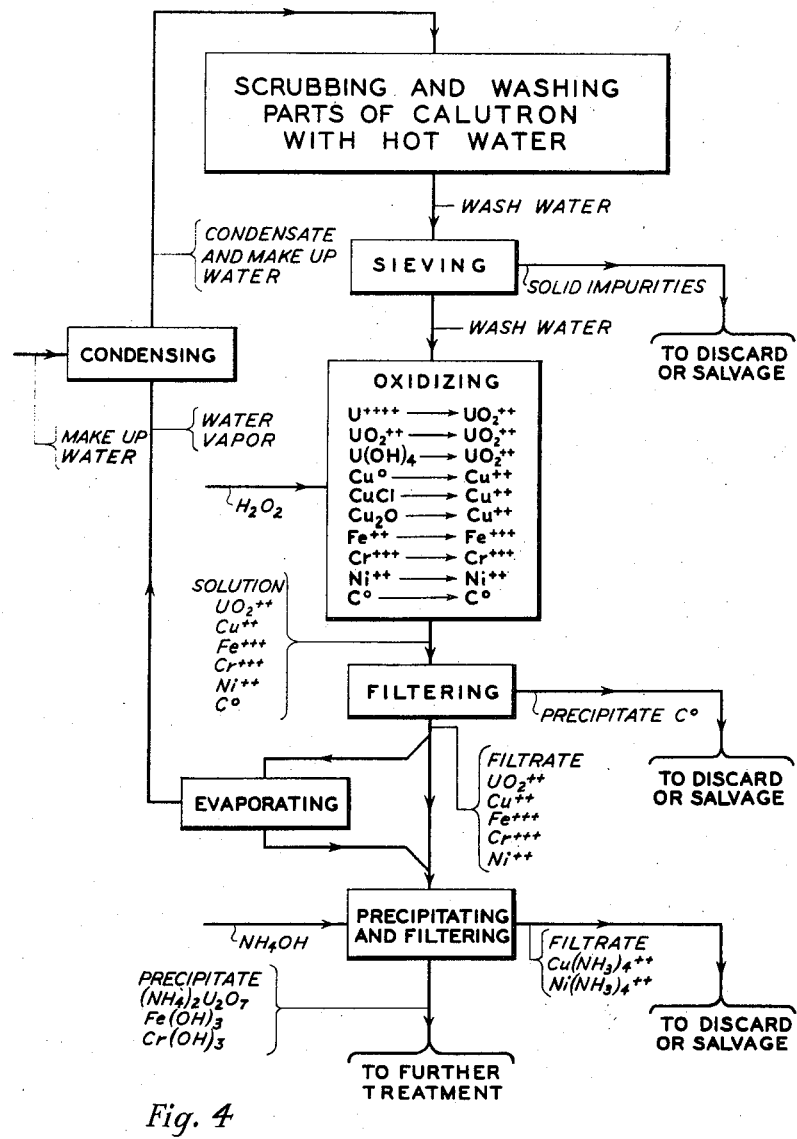
Figure 5:
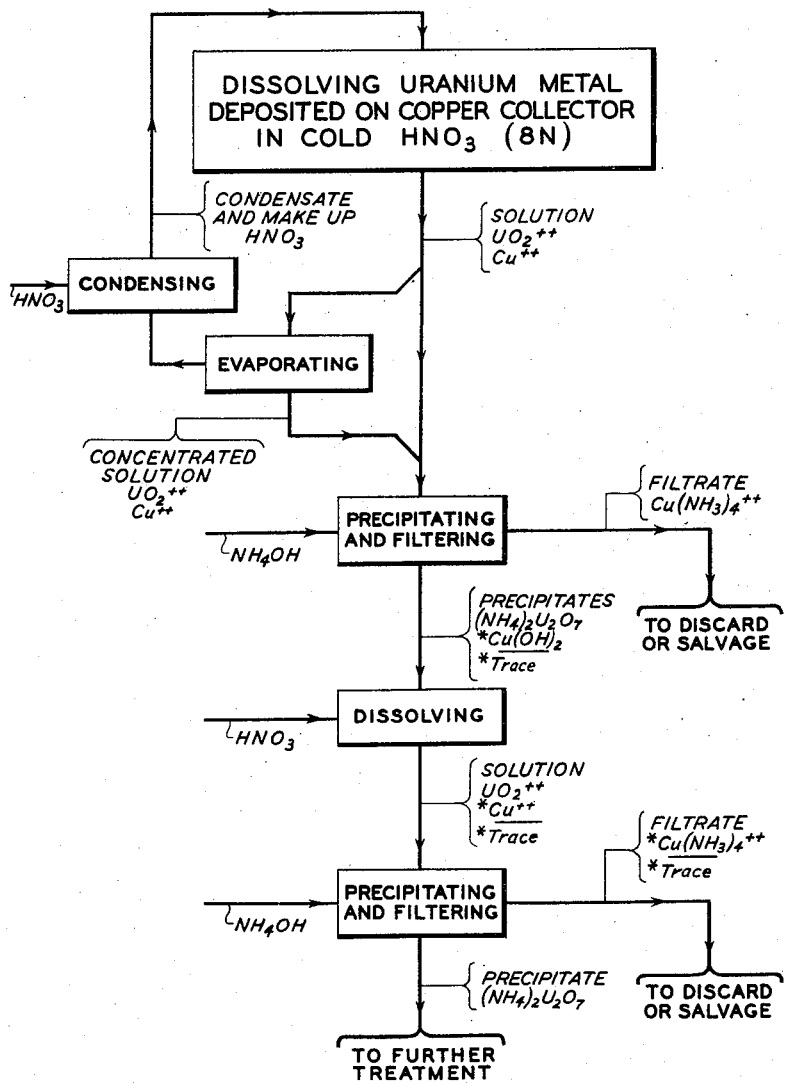
Figure 6:
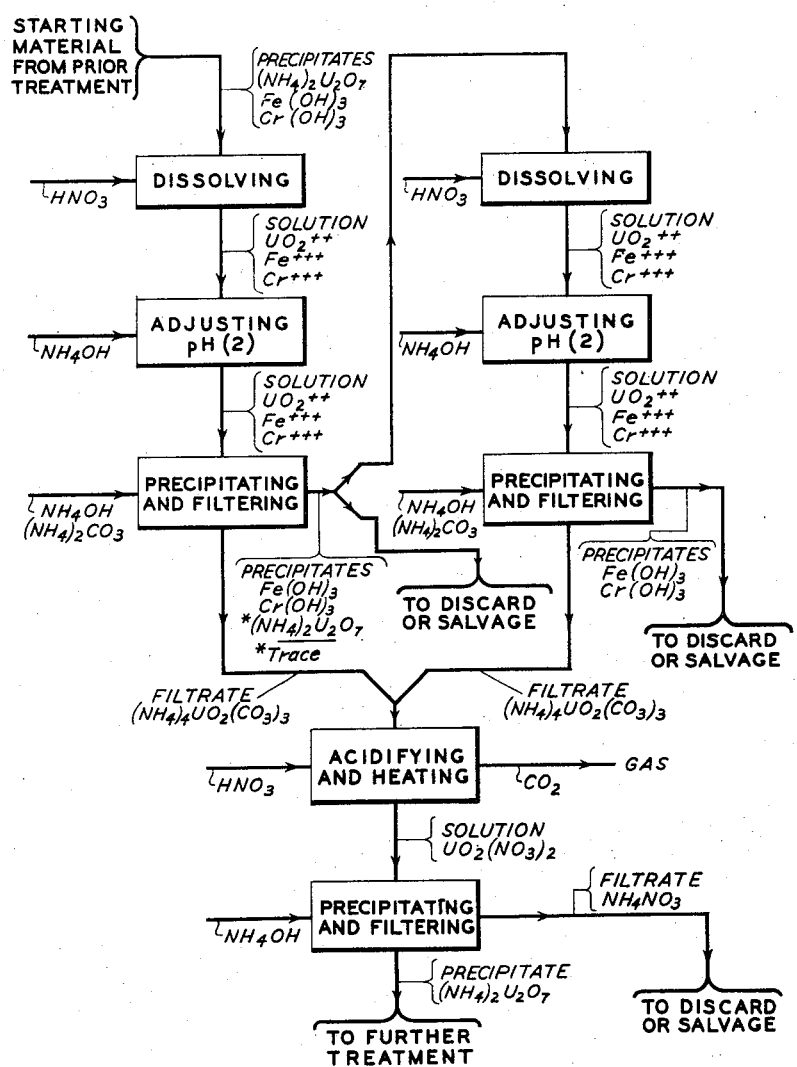
Figure 7:
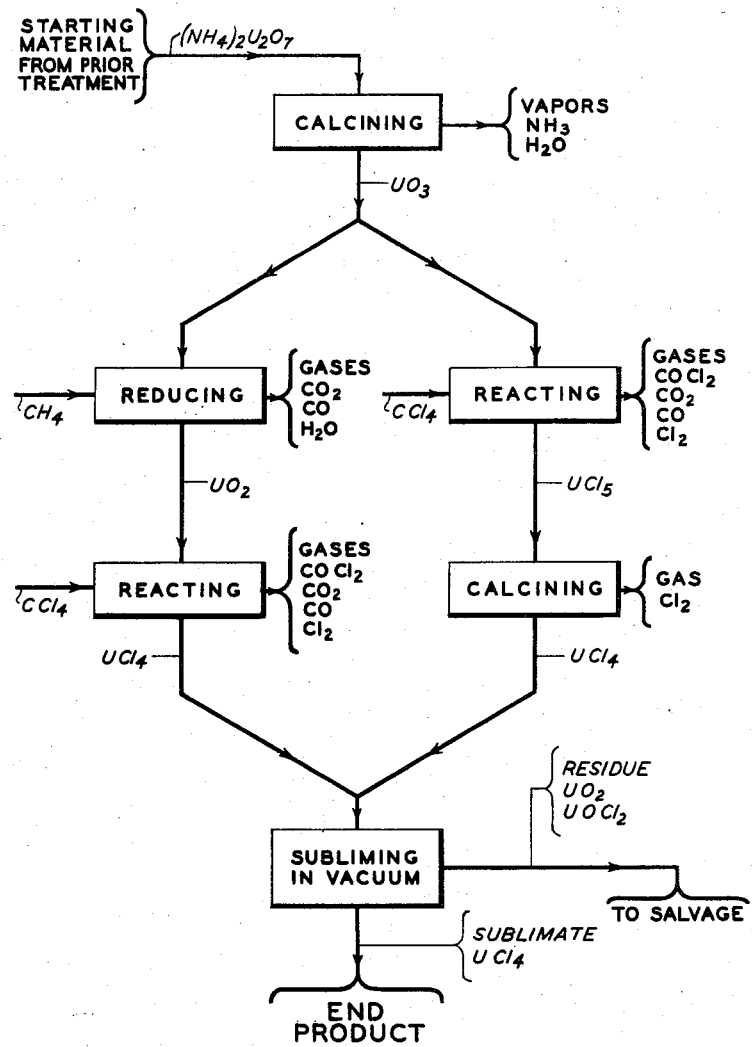

The invention, both as to its organization and method of operation, together with further objects and advantages thereof, will best be understood by reference to the following specification taken in connection with the accompanying drawings, in which Figure 1 is a perspective view, partly broken away, of a calutron that is suitable for use in carrying out the process of the present invention; Figs. 2 and 3 taken together, when arranged end to end, illustrate the overall flow diagram of the present process; Fig. 4 illustrates in greater detail a portion of the flow diagram of the present process, indicating the recovery of the residue of $UCl_4$ from the parts of the calutron disposed in the source region thereof upon which it is deposited, and the initial steps of the subsequent purification of the uranium; Fig. 5 illustrates in greater detail another portion of the flow diagram of the present process, indicating the recovery of metallic uranium from the collector of the calutron upon which it is deposited, and the initial steps of the subsequent purification of the uranium; Fig. 6 illustrates in greater detail a further portion of the flow diagram of the present process, indicating the subsequent steps of the purification of the recovered uranium; and Fig. 7 illustrates in greater detail a still further portion of the flow diagram of the present process, indicating the ultimate conversion of the purified uranium back to $UCl_4$.

At the outset, it is noted that a "calutron" is a machine of the character of that disclosed in the copending application of Ernest O. Lawrence, Serial No. 557,784, filed October 9, 1944, now Patent No. 2,709,222, and is employed to separate the constituent isotopes of an element and more particularly to increase the proportion of a selected isotope in an element containing several isotopes in order to produce the element enriched with the selected isotope. For example, the machine is especially useful in producing uranium enriched with $U^{235}$. Moreover, in such a machine it is not essential that the material initially introduced be a naturally occurring polyisotope, such as naturally occurring uranium. It is feasible to separate any intermixed or intermingled materials capable of producing ions distinguishable from each other by differences in nuclear mass. Since this is true, it is not essential that the initial material mixtures be made up necessarily of the same chemical elements, as various different elements in intermixed form can readily be separated.

Such a calutron essentially comprises means for vaporizing a quantity of material containing an element which is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope. It will be appreciated that in the event that an element is being separated from other elements, then said element occupies a position with respect to said other elements as said selected isotope occupies with respect to the several other isotopes of the element being enriched with respect to said selected isotope.

Referring now more particularly to Fig. 1, there is illustrated a representative example of a calutron 10 of the character noted, which comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order of $10^{-5}$ to $10^{-4}$ mm. Hg. Preferably, the component parts of the tank 13 are formed of steel, the bottom wall 15 thereof resting directly upon the pole face of the lower pole piece 12, and the top wall 14 thereof being spaced a suitable distance from the pole face of the upper pole piece 11, whereby the top and bottom walls 14 and 15 constitute in effect pole pieces with respect to the interior of the tank 13, as explained more fully hereinafter.

The removable end wall 18 carries an insulator 20 which supports an upstanding charge block 21, provided with a hollow central cavity 22 constituting a charge receiving pocket surrounded by rather thick side walls. Electrical heating elements 23 are embedded in the side walls of the charge block 21 and are adapted to be connected to a suitable source of current, whereby the charge block 21 may be appropriately heated, the charge block 21 being formed of cast steel or the like. Also, the charge block 21 is provided with a removable cover, not shown, and supports a tubular member 24 which in turn supports an arc block 25 formed of carbon or graphite. The arc block 25 is substantially C-shaped in plan, an upstanding slot 26 being formed in the wall thereof remote from the charge block 21. Thus, the arc block 25 is of hollow construction, having a central arc cavity 27 formed therein, the arc cavity 27 formed in the arc block 25 communicating through the tubular member 24 with the cavity 22 formed in the charge block 21.

Also, the removable end wall 18 carries an insulator 28, disposed above the insulator 20, which supports horizontally projecting cathode structure 29, including a filamentary cathode 30 adapted to be connected to a suitable source of current. The cathode structure 29 projects over the upper end of the charge block 21, whereby the filamentary cathode 30 overhangs and is aligned with respect to the upper end of the cavity 27 formed in the arc block 25. Further, an anode 31 is arranged below and in alignment with respect to the lower end of the cavity 27 formed in the arc block 25, the anode 31 being supported by the charge block 21. The filamentary cathode 30 and the cooperating anode 31 are adapted to be connected to a suitable source of current.

Ion accelerating structure, including a pair of upstanding plates 32 formed of carbon or graphite, is supported by insulating structure, not shown, carried by the removable end wall 18. The pair of upstanding plates 32 are arranged in spaced-apart relation in order to define a slit 33 therebetween, arranged in substantial alignment with respect to the slot 26 formed in the wall of the arc block 25. A suitable source of voltage is adapted to be connected between the arc block 25 and the ion accelerating structure, including the plates 32, for a purpose more fully explained hereinafter.

The removable end wall 19 carries an insulator 34 which supports an upstanding collector block 35 formed of copper or the like and provided with two laterally spaced-apart cavities or pockets 36 and 37 which communicate with aligned slots 38 and 39 formed in the wall of the collector block 35 disposed remote from the removable end wall 19. It is noted that the pockets 36 and 37 are adapted to receive two constituent isotopes of an element which have been separated in the calutron 10, as explained more fully hereinafter. Finally, the inner wall 16 carries a number of insulators 40 which support a tubular liner 41 formed of copper or the like, rectangular in vertical cross-section, disposed within the tank 13 and spaced from the walls 14, 15, 16 and 17 thereof. One end of the tubular liner 41 terminates adjacent the accelerating structure, including the plates 32; and the other end of the tubular liner 41 terminates adjacent the collector block 35; the tubular liner 41 constituting an electrostatic shield for the high-velocity ions traversing the curved paths between the slit 33 formed by the plates 32 of the ion accelerating structure and the slots 38 and 39 formed in the collector block 35, as explained more fully hereinafter.

In view of the above description, it will be understood that the parts of the calutron 10 carried by the removable end wall 18 constitute a source unit, and the end of the tank 13 disposed adjacent the source unit constitutes the source region of the calutron. Similarly, the parts of the calutron carried by the removable end wall 19 constitute a collector unit, and the end of the tank 13 disposed adjacent the collector unit constitutes the collector region of the calutron.

Considering now the general principle of operation of the calutron 10, a charge comprising a compound of the element to be treated is placed in the charge pocket 22 in the charge block 21, the compound of the element mentioned being one which may be readily vaporized. The cover, not shown, is then secured on the charge block 21 and the end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg is established within the tank 13, the electric circuits for the windings associated with the pole pieces 11 and 12 are closed and adjusted, whereby a predetermined magnetic field is established therebetween, traversing the tank 13. The electric circuit for the heating elements 23 is closed, whereby the charge in the charge pocket 22 in the charge block 21 is heated and vaporized. The vapor fills the charge pocket 22 and is conducted through the tubular member 24 into the cavity 27 formed in the arc block 25. The electric circuit for the filamentary cathode 30 is closed, whereby the filamentary cathode 30 is heated and rendered electron-emissive. Then the electric circuit between the filamentary cathode 30 and the anode 31 is closed, whereby an arc discharge is struck therebetween, electrons proceeding from the filamentary cathode 30 to the anode 31. The electrons proceeding from the filamentary cathode 30 to the anode 31 break up the molecular form of the compound of the vapor to a considerable extent, producing positive ions of the element which is to be enriched with a selected one of its isotopes.

The electric circuit between the arc block 25 and the ion accelerating structure, including the plates 32, is completed, the plates 32 being at a high negative potential with respect to the arc block 25, whereby the positive ions are attracted and accelerated to the voltage impressed between the arc block 25 and the ion accelerating structure. More particularly, the positive ions proceed from the interior of the cavity 27 formed in the arc block 25, through the slot 26 formed in the wall thereof, and across the space between the plates 32 and the adjacent wall of the arc block 25, and thence through the slit 33 formed between the plates 32 into the interior of the tubular liner 41. The high-velocity positive ions form a vertical upstanding ribbon proceeding from the cavity 27 formed in the arc block 25 through the slot 26 and the aligned slit 33 into the tubular liner 41.

The collector block 35, as well as the tubular liner 41, is electrically connected to the ion accelerating structure, including the plates 32, whereby there is an electric field-free path for the high-velocity positive ions, disposed between the plates 32 and the collector block 35 within the tubular liner 41. The high-velocity positive ions entering the adjacent end of the liner 41 are deflected from their normal straight-line path and from a vertical plane, passing through the slot 26 and the slit 33, due to the effect of the relatively strong magnetic field maintained through the space within the tank 13 and the liner 41 through which the positive ions travel, whereby the positive ions described arcs, the radii of which are proportional to the square roots of the masses of the ions and consequently of the isotopes of the element mentioned. Thus, ions of the relatively light isotope of the element describe and interior arc of relatively short radius and are focused through the slot 38 into the pocket 36 formed in the collector block 35; whereas ions of the relatively heavy isotope of the element describe an exterior arc of relatively long radius and are focused through the slot 39 into the pocket 37 formed in the collector block 35. Accordingly, the ions of the relatively light isotope of the element are collected in the pocket 36 and are de-ionized to produce a deposit of the relatively light isotope of the element therein, while the ions of the relatively heavy isotope of the element are collected in the pocket 37 and deionized to produce a deposit of the relatively heavy isotope of the element therein.

After all of the charge in the charge pocket 22 formed in the charge block 21 has been vaporized, all of the electric circuits are interrupted and the end wall 18 is removed so that another charge may be placed in the pocket 22 and subsequently vaporized in the manner explained above. After a suitable number of charges have been vaporized in order to obtain appropriate deposits of the isotopes of the element in the pockets 36 and 37 of the collector block 35, the end wall 19 may be removed and the deposits of the collected isotopes in the pockets 36 and 37 in the collector block 35 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection, reference is again made to the copending application of Ernest O. Lawrence for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge block 21 is $UCl_4$, as this compound may be readily vaporized and the molecular form of the vapor may be readily broken up to form positive ions of uranium with great facility. In this case, uranium enriched with $U^{235}$ is collected in the pocket 36 of the collector block 35, and uranium comprising principally $U^{238}$ is collected in the pocket 37 of the collector block 35. Also, it is noted that from a practical standpoint, the deposit of uranium collected in the pocket 36 of the collector block 35 contains considerable amounts of $U^{238}$, in view of the fact that this isotope comprises the dominant constituent of ordinary uranium. Furthermore, the deposit of uranium collected in the pocket 36 of the collector block 35 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 36 of the collector block 35 is considerably enriched, both with $U^{234}$ and $U^{235}$, and considerably improverished with respect to $U^{238}$ as compared to natural or normal uranium.

During the operation of the calutron 10 in the production of uranium enriched with $U^{235}$, the compound $UCl_4$ is vaporized in the charge block 21 and conducted through the tubular member 24 into the cavity 27 formed in the arc block 25, where it is subjected to ionization as previously explained. Only a minor fraction (about 5%) of the $UCl_4$ vapor is actually ionized in the cavity 27 formed in the arc block 25 and drawn through the slot 26 due to the ion accelerating structure, including the plates 32. The major fraction (about 95%) of the $UCl_4$ vapor is un-ionized in the cavity 27 formed in the arc block 25 and flows through the slot 26 due to the pressure differential between the cavity 27 and the interior of the liner 41. This major fraction of the $UCl_4$ vapor, being un-ionized, is not at all affected by the ion accelerating structure, including the plates 32, and travels into contact with the various parts of the calutron disposed in the source region thereof, upon which parts it is condensed primarily in the compound form $UCl_4$ as a residue. More particularly, this residue is condensed principally upon the interior of the adjacent end of the liner 41, but to some extent upon the exterior thereof, the walls of the tank 13 in the region of the source and upon the exterior surfaces of the various elements of the source unit including the arc block 25, the charge block 21, etc.

More particularly, the minor fraction of the $UCl_4$ vapor is ionized to form positive atomic ions including $U^+$, $U^{++}$, $Cl^+$ and $Cl^{++}$; and positive molecular ions including $Cl_2^+$, $Cl_2^{++}$, $UCl_4^+$, $UCl_4^{++}$, $UCl_3^+$, $UCl_3^{++}$, $UCl_2^+$, $UCl_2^{++}$, $UCl^+$ and $UCl^{++}$. Of these atomic and molecular ions only the singly ionized atomic ions $U^+$ have the required ratio between mass and charge such that they are focused through the slots 38 and 39 into the pockets 36 and 37 formed in the collector block 35; the atomic ions $U^+$ of masses 234 and 235 focusing through the slot 38 into the pocket 36, and the atomic ion $U^+$ of mass 238 focusing through the slot 39 into the pocket 37, as previously noted.

The doubly ionized atomic ions $U^{++}$ have such a ratio between mass and charge that they are deflected along an arc of shorter radius into engagement with the inner wall of the liner 41, where they are de-ionized to form a deposit thereon. The singly and doubly ionized atomic ions $Cl^+$ and $Cl^{++}$ and the singly and doubly ionized molecular ions $Cl_2^+$ and $Cl_2^{++}$ have such small ratios between mass and charge that they are deflected along arcs of very short radii into engagement with the inner wall of the liner 41 adjacent the source region, where they are de-ionized to form neutral chlorine molecules, which gas is subsequently pumped from the tank 13 due to the operation of the vacuum pumping apparatus previously noted. Similarly, the doubly ionized molecular ions $UCl_4^{++}$, $UCl_3^{++}$, $UCl_2^{++}$ and $UCl^{++}$ have intermediate ratios between mass and charge such that they are deflected along arcs of intermediate radii into engagement with the inner wall of the liner 41 intermediate the source region and the collector region, where they are de-ionized to form a deposit thereon. Finally, the singly ionized molecular ions $UCl_4^+$, $UCl_3^+$, $UCl_2^+$ and $UCl^+$ have large ratios between mass and charge, such that they are deflected along arcs of large radii into engagement with the outer wall of the liner 41 intermediate the source region and the collector region, where they are de-ionized to form a deposit thereon.

Accordingly, it will be understood that, after operation of the calutron 10 to vaporize a reasonable number of charges of $UCl_4$ in the charge block 21, a considerable deposit of $UCl_4$ is formed on the adjacent end of the liner 41, and that a reasonable deposit of metallic uranium, as well as the various uranium chlorides, is formed on the intermediate portion of the liner 41. These deposits represent uranium which contains the various isotopes $U^{238}$, $U^{235}$ and $U^{234}$ in natural or normal amounts such that these deposits should be recovered for recycling purposes as well as to clean the liner 41 and the other parts of the calutron 10 in order to insure efficient operation thereof.

Considering the present process in greater detail with reference to the production of uranium enriched with $U^{235}$, it is pointed out that natural or normal uranium comprises three isotopes, $U^{238}$, $U^{235}$ and $U^{234}$, in the approximate relative abundances 1, 1/139 and 1/16,700 (in numbers of atoms with reference to $U^{238}$), respectively, or approximately 16,700, 120 and 1 atoms, repectively, in 16,821 atoms of a sample. It is highly desirable to prepare large quantities of uranium enriched with the thermal-neutron fissionable isotope $U^{235}$ for commercial purposes, and it has been found that this end can be accomplished by employing the calutron method. However, it is desirable that the uranium product have an enrichment factor with respect to $U^{235}$ of the order of 400, this factor being defined as the quotient obtained by dividing the ratio of $U^{235}$ to $U^{238}$ in the product with the ratio of $U^{235}$ to $U^{238}$ in the original material. Now assuming that the product is enriched by 400 in both $U^{235}$ and $U^{234}$, it comprises $U^{238}$, $U^{235}$ and $U^{234}$ in the approximate relative abundances 1, 400/139 and 400/16,700 (in numbers of atoms with reference to $U^{238}$), respectively, or approximately 16,700, 48,057 and 400 atoms, respectively, in 65,157 atoms of a sample. Thus the enriched uranium product comprises approximately 25.7% $U^{238}$, 73.7% $U^{235}$ and 0.6% $U^{234}$.

In order to obtain this desired enrichment of the uranium product by utilizing the calutron method, it has been found most convenient to use first-stage and second-stage calutrons, the first-stage calutrons employing natural or normal uranium and producing a first-stage enriched product having an enrichment factor of the order of 20 with respect to natural or normal uranium; and the second-stage calutrons employing first-stage enriched uranium and producing a second-stage enriched product having an enrichment factor of the order of 20 with respect to the first-stage enriched uranium, whereby the second-stage enriched uranium product has a final enrichment factor of the order of 400 with respect to natural or normal uranium. By employing the present process, whereby the ultimate enrichment of the final uranium product is obtained in two stages, as indicated above, each of the first-stage and the second-stage calutrons may be operated in the stable range and to give a maximum yield of enriched material.

Accordingly, in the present process it will be understood that in the event the calutron 10 comprises a first-stage calutron, the deposit of uranium in the pocket 37 in the collector block 35 has been impoverished with respect to the desired isotope $U^{235}$, and is recovered therefrom and discarded; while the deposit of uranium in the pocket 36 in the collector block 35 has been singly enriched with respect to the desired isotope $U^{235}$, and is recovered therefrom and subsequently treated in a second-stage calutron. On the other hand, in the event the calutron 10 comprises a second-stage calutron, the deposit of uranium in the pocket 37 in the collector block 35 has been first enriched and then impoverished with respect to the desired isotope $U^{235}$, and is recovered therefrom and analyzed for possible recycling in a first-stage calutron; while the deposit of uranium in the pocket 36 in the collector block 35 has been doubly enriched with respect to the desired isotope $U^{235}$, and is recovered therefrom for commercial use.

Thus it will be understood that in a first-stage calutron, the deposit of metallic uranium in the pocket 36 in the collector block 35 has been subjected to one treatment and is termed "singly enriched" uranium, the enrichment being with respect to the desired isotope, $U^{235}$; on the other hand, in a second-stage calutron the deposit of metallic uranium in the pocket 36 in the collector block 35 has been subjected to two treatments and is termed "doubly enriched" uranium, the enrichment being with respect to the desired isotope, $U^{235}$.

Considering now the present process in greater detail, and referring to the composite flow diagram illustrated in Figs. 2 and 3, it will be understood that a plant arranged to carry out the process will comprise a relatively large number of first-stage calutrons and a relatively small number of second-stage calutrons, in addition to facilities for handling, storing, recovering, purifying and converting the various metallic and compound forms of uranium. As illustrated in the diagram, the starting material employed as a charge in the first-stage calutron is $UCl_4$, comprising natural or normal uranium, whereby metallic uranium singly enriched with $U^{235}$ is deposited in the first pocket of the collector and metallic uranium impoverished with respect to $U^{235}$ is deposited in the second pocket of the collector. Also, a large amount of $UCl_4$ is deposited as a residue upon the parts of the first-stage calutron disposed in the source region thereof, the deposit being primarily on the source-region end of the liner. After several charges of $UCl_4$, comprising natural or normal uranium, have been employed in the first-stage calutron, reasonable deposits of metallic uranium have been collected in the first and second pockets of the collector, and the metallic uranium deposits in the collector and the $UCl_4$ residue on the liner are recovered.

More particularly, the metallic uranium singly enriched with $U^{235}$ and deposited in the first pocket of the collector is recovered by an acid wash process, whereby various impurities including copper are introduced in the wash solution, due to the fact that the collector of the first-stage calutron which is thus washed with acid is formed of the metal mentioned. Accordingly, the wash solution containing the uranium singly enriched with $U^{235}$ which has been reclaimed contains considerable impurities. This wash solution is stored and subsequently employed as makeup material in a purification process utilized in conjunction with the second-stage calutron, in a manner more fully explained hereinafter. The metallic uranium impoverished with respect to $U^{235}$ and deposited in the second pocket of the collector is recovered by an acid wash process and discarded, as it contains so little $U^{235}$ and further processing thereof is not feasible.

The residue of $UCl_4$ deposited on the parts of the first-stage calutrons disposed in the source region thereof, principally upon the liner, is recovered by a water wash process, whereby various impurities including copper, iron, chromium, nickel and carbon are introduced in the wash solution, due to the fact that the various parts of the first-stage calutron which are thus washed with water are formed of the materials mentioned. Accordingly, the wash solution containing natural or normal uranium which has been reclaimed, contains considerable impurities. To this wash solution there is added makeup material in the form of a wash solution derived from the second-stage calutron, and comprising the wash solution from the second pocket of the collector, and containing uranium which has been first enriched with $U^{235}$ in the first-stage calutron and subsequently impoverished with respect to $U^{235}$ in the second-stage calutron, as explained more fully hereinafter. This composite wash solution is then purified in order to eliminate the impurities mentioned; the impurities thus eliminated are discarded; and the uranium thus purified is then converted back to the compound $UCl_4$. This compound of $UCl_4$ is then employed, along with a suitable amount of makeup $UCl_4$, as a charge in the first-stage calutron.

Accordingly, the residue of $UCl_4$ deposited in the source region of the first-stage calutron is treated to render it recyclable therein; the first-stage enriched uranium is stored for use in the second-stage calutron; and the first-stage impoverished uranium is discarded.

The starting material employed as a charge in the second-stage calutron is $UCl_4$, comprising singly enriched uranium, whereby metallic uranium doubly enriched with $U^{235}$ is deposited in the first pocket of the collector and metallic uranium which has been first enriched in the first-stage calutron and then impoverished in the second-stage calutron is deposited in the second pocket of the collector. Also, a large amount of $UCl_4$ is deposited as a residue upon the parts of the second-stage calutron disposed in the source region thereof, the deposit being primarily on the source-region end of the liner. After several charges of $UCl_4$ comprising singly enriched uranium have been employed in the second-stage calutron, reasonable deposits of metallic uranium have been collected in the first and second pockets of the collector, and the metallic uranium deposits in the collector and the $UCl_4$ residue on the liner are recovered.

More particularly, the metallic uranium doubly enriched with $U^{235}$ and deposited in the first pocket of the collector is recovered by an acid wash process, whereby various impurities including copper are introduced in the wash solution, due to the fact that the collector of the second-stage calutron which is thus washed with acid is formed of the metal mentioned. Accordingly, the wash solution containing the uranium doubly enriched with $U^{235}$ which has been reclaimed contains considerable impurities. This wash solution is then purified in order to eliminate the impurities mentioned; the impurities thus eliminated are discarded or salvaged; and the uranium thus purified is converted into a standard compound of uranium for commercial use. The metallic uranium first enriched with $U^{235}$ and subsequently impoverished with respect to $U^{235}$ and deposited in the second pocket of the collector is recovered by an acid wash process, whereby various impurities including copper are introduced in the wash solution, due to the fact that the collector of the second-stage calutron which is thus washed with acid is formed of the metal mentioned. Accordingly, the wash solution containing the uranium first enriched with $U^{235}$ and subsequently impoverished with respect to $U^{235}$ which has been reclaimed contains considerable impurities. The uranium in the wash solution is then analyzed, and in the event it contains at least as much $U^{235}$ as natural or normal uranium, it is employed as makeup material in the purification process utilized in conjunction with the first-stage calutron.

The residue of $UCl_4$ deposited on the parts of the second-stage calutron disposed in the source region thereof, principally upon the liner, is recovered by a water wash process, whereby various impurities including copper, iron, chromium, nickel and carbon are introduced in the wash solution due to the fact that the various parts of the second-stage calutron which are thus washed with water are formed of the materials mentioned. Accordingly, the wash solution containing the singly enriched uranium which has been reclaimed contains considerable impurities. To this wash solution there is added the previously stored makeup material in the form of the wash solution derived from the first-stage calutron and comprising the acid wash solution from the first pocket of the collector of the first-stage calutron and comprising singly enriched uranium. This composite wash solution is then purified in order to eliminate the impurities mentioned; the impurities thus eliminated are discarded or salvaged; and the uranium thus purified is then converted back to the compound $UCl_4$. This compound of $UCl_4$ is then employed as a charge in the second-stage calutron.

Accordingly, the residue of $UCl_4$ deposited in the source region of the second-stage calutron is treated to render it re-cyclable therein; the second-stage enriched uranium is converted to a standard compound of uranium to be used commercially; and the second-stage impoverished uranium is stored for use in the first-stage calutron.

Considering now the details of the recovery of the $UCl_4$ residue from the parts of either a first-stage or a second-stage calutron disposed in the source region thereof, and the initial steps of the subsequent purification of the uranium thus recovered, reference is made to the portion of the flow diagram illustrated in Fig. 4. The parts of the calutron disposed in the source region thereof, principally the source-region end of the liner, are scrubbed and washed with hot water, whereby the residue of $UCl_4$ deposited thereon is dissolved; and various impurities, including copper, iron, chromium, nickel and carbon are introduced in the water wash, due to the fact that the various parts of the calutron which are thus washed with the hot water are formed of the materials mentioned. The wash water is then sieved in order to remove any solid impurities which may be picked up, such, for example, as small pieces of metal and carbon. These solid impurities may be either discarded or subjected to salvage treatment in order to recover any occluded uranium. The sieved wash water is then treated with $H_2O_2$ by adding a slight excess of 10% $H_2O_2$ and agitating the solution, in order to oxidize the various contained materials. For example, the wash water may contain suspended $U(OH)_4$ and bits of copper and carbon; dissolved uranium in the $+4$ and $+6$ valence states; as well as dissolved copper, iron, nickel, chromium and possibly other metals in one or more of the positive valence states. Hence, all of the uranium is put in solution as uranyl ion, suspended copper is put in solution as cupric ion, and other dissolved metals are put in solution in their higher stable valence states. Carbon is not oxidized by this treatment. The effect of the oxidation on the various materials contained in the wash solution may be indicated as follows:

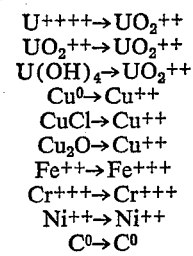

$$U^{++++} \rightarrow UO_2^{++}$$
$$UO_2^{++} \rightarrow UO_2^{++}$$
$$U(OH)_4 \rightarrow UO_2^{++}$$
$$Cu^0 \rightarrow Cu^{++}$$
$$CuCl \rightarrow Cu^{++}$$
$$Cu_2O \rightarrow Cu^{++}$$
$$Fe^{++} \rightarrow Fe^{+++}$$
$$Cr^{+++} \rightarrow Cr^{+++}$$
$$Ni^{++} \rightarrow Ni^{++}$$
$$C^0 \rightarrow C^0$$

Accordingly, the oxidized wash water contains at least the following: $UO_2^{++}$, $Cu^{++}$, $Fe^{+++}$, $Cr^{+++}$, $Ni^{++}$ and $C^0$ (carbon). The oxidized wash water is then filtered in order to remove $C^0$, which may be discarded or subjected to salvage treatment in order to recover any uranium occluded.

In the event this filtrate is rather dilute, it may be concentrated by evaporation; otherwise, this step is omitted. In the event the filtrate is concentrated by evaporation, the water vapor which is driven off is condensed and to it is added enough makeup water in order to provide a new wash solution, which is used again to wash the parts of the first-stage calutron disposed in the source region thereof, in the manner previously explained. This step, comprising condensing and reusing the water vapor which is driven off the filtrate incident to concentration by evaporation, is advantageous in view of the fact that any uranium entrained in the water vapor is not lost to the outside.

The original filtrate mentioned above, or the concentrated filtrate following evaporation, in the event this step is employed, is then subjected to ammonia treatment, either with excess $NH_3$ gas or carbonate-free $NH_4OH$, whereby $(NH_4)_2U_2O_7$, $Fe(OH)_3$ and $Cr(OH)_3$ are precipitated away from most of the copper and nickel in solution, in the form of ammonia complex ions, $Cu(NH_3)_4^{++}$ and $Ni(NH_3)_4^{++}$. The solution is then filtered and the precipitate consisting of ammonium diuranate, ferric hydroxide and chromic hydroxide is then washed with water containing about 1% $NH_4OH$ and 1% $NH_4NO_3$ in order to eliminate occluded copper and nickel ammonia complex ions. The filtrate containing the copper and nickel ammonia complex ions is then discarded or subjected to salvage treatment in order to recover any uranium contained; and the initially purified precipitate of $(NH_4)_2U_2O_7$, $Fe(OH)_3$ and $Cr(OH)_3$ is then stored for further treatment.

It will be understood that the stored precipitate derived from the parts of the first-stage calutron disposed in the source region thereof, as explained above, comprises uranium of natural or normal composition with reference to $U^{235}$; while the stored precipitate derived from the parts of the second-stage calutron disposed in the source region thereof, as explained above, comprises uranium which is singly enriched with $U^{235}$.

Considering now the details of the recovery of the metallic uranium, singly enriched with $U^{235}$, from the first pocket of the collector of the first-stage calutron, or of the metallic uranium, doubly enriched with $U^{235}$, from the first pocket of the collector of the second-stage calutron, and the initial steps of the subsequent purification of the uranium thus recovered, reference is made to the portion of the flow diagram illustrated in Fig. 5. The inner surfaces of the first pocket of the collector of the calutron are etched with $HNO_3$, about 8N, whereby the deposit of metallic uranium, either singly or doubly enriched with $U^{235}$, is dissolved; and various impurities, principally copper, are introduced in the acid wash solution, due to the fact that the collector of the calutron which is thus etched with nitric acid is formed of the material mentioned. Accordingly, the wash acid contains at least the following ions: $UO_2^{++}$ and $Cu^{++}$.

In the event this wash acid is rather dilute in these ions, it may be concentrated by evaporation; otherwise, this step is omitted. In the event the wash acid is concentrated by evaporation, the $HNO_3$ vapor which is driven off is condensed and to it is added enough makeup $HNO_3$ in order to provide a new wash acid, which is again used to wash the first pocket of the collector of the calutron in the manner previously explained. This step, comprising condensing the $HNO_3$ vapor which is driven off the wash acid incident to concentration by evaporation, is advantageous in view of the fact that any uranium entrained in the $HNO_3$ vapor is not lost to the outside.

The original wash acid mentioned above, or the concentrated wash acid following evaporation, in the event this step is employed, is then subjected to ammonia treatment, either with $NH_3$ gas or carbonate-free $NH_4OH$, whereby $(NH_4)_2U_2O_7$ is precipitated away from most of the copper which remains in solution as ammonia complex ion, $Cu(NH_3)_4^{++}$. The solution is then filtered and the precipitate, ammonia diuranate, is then washed with water containing about 1% $NH_4OH$ and 1% $NH_4NO_3$, in order to eliminate occluded copper complex ion. The filtrate containing the copper ammonia complex ion is then subjected to salvage treatment in order to recover any uranium contained. Preferably, the precipitate of ammonium diuranate, and perhaps a trace of $Cu(OH)_2$, is dissolved in $HNO_3$, re-precipitated with $NH_4OH$ and re-washed with water containing about 1% $NH_4OH$ and 1% $NH_4NO_3$ in the manner explained above. This solution is then filtered and the filtrate, consisting principally of $Cu(NH_3)_4^{++}$ ion, is then discarded or subjected to further salvage treatment in order to recover any uranium contained; and the precipitate of ammonium diuranate is then stored for further treatment.

It will be understood that the stored precipitate derived from the first pocket of the collector of the first-stage calutron, as explained above, comprises uranium which is singly enriched with $U^{235}$; while the stored precipitate derived from the first pocket of the collector of the second-stage calutron comprises uranium which is doubly enriched with $U^{235}$.

The metallic uranium impoverished with respect to $U^{235}$ and deposited in the second pocket of the collector of the first-stage calutron may be recovered merely by etching the inner surfaces of the second pocket of this collector with 8N $HNO_3$, whereby this deposit of metallic uranium is dissolved. This acid wash solution is then discarded, as it contains so little $U^{235}$ that further processing thereof is not feasible.

On the other hand, the metallic uranium which has been first enriched with respect to $U^{235}$ and subsequently impoverished with respect to $U^{235}$, and deposited in the second pocket of the collector of the second-stage calutron, may be recovered by etching the inner surfaces of the second pocket of this collector with 8N $HNO_3$, whereby this deposit of metallic uranium is dissolved; and various impurities, principally copper, are introduced in the acid wash solution, due to the fact that the collector of the second-stage calutron thus etched with nitric acid is formed of the material mentioned. Accordingly, the wash acid contains at least the following ions: $UO_2^{++}$ and $Cu^{++}$. The considerations concerning whether the wash acid should be concentrated are the same as those previously noted. In any case, either the original wash acid mentioned above, or the concentrated wash acid following evaporation, in the event this step is employed, is then analyzed in order to determine the $U^{235}$ content thereof. In the event the analysis indicates that the $U^{235}$ content of this wash acid is at least as great as natural or normal uranium, it is conserved for further treatment; on the other hand, in the event the analysis indicates that the $U^{235}$ content of this wash acid is less than that of natural or normal uranium, it is discarded, as further processing thereof is not feasible.

Assuming that the analysis indicates that the $U^{235}$ content of this conserved wash acid is at least as great as that of natural or normal uranium, it is subjected to initial purification by the ammonia process previously described, whereby a precipitate of $(NH_4)_2U_2O_7$ is obtained, which is then stored for further treatment.

To the stored precipitate derived after initial purification from the parts of the first-stage calutron disposed in the source region thereof, there is added the stored precipitate derived after initial purification from the second pocket of the collector of the second-stage calutron, in order to produce a first composite precipitate; this first composite precipitate comprises uranium of substantially natural or normal composition with reference to $U^{235}$. Also, to the stored precipitate derived after initial purification from the parts of the second-stage calutron disposed in the source region thereof, there is added the stored precipitate derived after initial purification from the first pocket of the collector of the first-stage calutron, in order to produce a second composite precipitate; this second composite precipitate comprises uranium which is singly enriched with $U^{235}$. Finally, the stored precipitate derived after initial purification from the first pocket of the collector of the second-stage calutron constitutes a third composite precipitate; this third composite precipitate comprises uranium which is doubly enriched with $U^{235}$.

Considering now the details of the subsequent purification of one of the composite precipitates described above, comprising $(NH_4)_2U_2O_7$, $Fe(OH)_3$ and $Cr(OH)_3$, reference is made to the portion of the flow diagram illustrated in Fig. 6. The composite precipitate is first dissolved in $HNO_3$ and the pH of the solution is adjusted to about 2, using 6N $NH_4OH$, whereby the solution contains the following ions: $UO_2^{++}$, $Fe^{+++}$ and $Cr^{+++}$, the ions being in the higher stable valence states. The solution is then treated with an excess of a $NH_4OH$—$(NH_4)_2CO_3$ reagent, comprising an approximately saturated solution of $(NH_4)_2CO_3$ in 3N $NH_4OH$, whereby $Fe(OH)_3$ and $Cr(OH)_3$ are precipitated, while the uranium remains in solution as the uranyl carbonate complex ion $UO_2(CO_3)_3^{----}$. The solution is then filtered and the precipitate is washed with water containing $NH_4OH$ and $(NH_4)_2CO_3$ in order to recover any occluded uranium.

In the event that it is felt necessary to recover traces of ammonium diuranate from the ferric hydroxide and chromic hydroxide precipitate, the precipitate mentioned may be again dissolved in $HNO_3$, the pH of the solution adjusted to about 2, the solution retreated with the $NH_4OH-(NH_4)_2CO_3$ reagent, and the solution again filtered and washed with water containing $NH_4OH$ and $(NH_4)_2CO_3$, all in the manner explained above. In this case, the precipitate of ferric hydroxide and chromic hydroxide may be discarded or subjected to salvage treatment in order to recover any trace of occluded uranium. Also in this case, the filtrate containing the uranyl carbonate complex ion is added back to the original filtrate containing the uranyl carbonate complex ion, and the filtrate is then subjected to further treatment.

In any case, regardless of whether one or more precipitations with $NH_4OH$ and $(NH_4)_2CO_3$ are employed, the filtrate containing $(NH_4)_4UO_2(CO_3)_3$ is acidified with concentrated $HNO_3$ and heated, in order to break up the uranyl carbonate complex ion to produce $UO_2(NO_3)_2$, whereby $CO_2$ is given off from the heated solution. This uranyl nitrate solution is then treated with carbonate-free $NH_4OH$, whereby $(NH_4)_2U_2O_7$ is precipitated. The solution is then filtered, whereby the filtrate containing $NH_4NO_3$ is discarded or subjected to salvage treatment in order to recover any $(NH_4)_2U_2O_7$ contained; and the uranium thus purified and in the compound form $(NH_4)_2U_2O_7$ is stored for further treatment or commercial use, as previously noted.

It will be understood that the purification of the first composite precipitate in the manner described above is productive of a first batch of $(NH_4)_2U_2O_7$ containing uranium of natural or normal composition with reference to $U^{235}$. Also, the purification of the second composite precipitate in the manner described above is productive of a second batch of $(NH_4)_2U_2O_7$ containing uranium which is singly enriched with $U^{235}$. Finally, the purification of the third composite precipitate in the manner described above is productive of a third batch of $(NH_4)_2U_2O_7$ containing uranium which is doubly enriched with $U^{235}$. The first and second batches of $(NH_4)_2U_2O_7$ are then converted back to $UCl_4$ for retreatment in the first-stage and second-stage calutrons, respectively; while the third batch of $(NH_4)_2U_2O_7$ is available for commercial use.

Considering now the details of the ultimate conversion of either the first batch or the second batch of $(NH_4)_2U_2O_7$ to $UCl_4$, reference is made to the portion of the flow diagram illustrated in Fig. 7. More particularly, a batch of $(NH_4)_2U_2O_7$ is calcined at approximately 300° C. in order to produce $UO_3$, whereby $NH_3$ gas and water vapor are given off incident to the calcination. The uranium trioxide thus produced may be converted by alternative processes into crude $UCl_4$. In accordance with one process, the $UO_3$ is first reduced to $UO_2$ by heating with $CH_4$ at approximately 450° C., as disclosed in the copending application of Milton J. Polissar, Serial No. 494,448, filed July 13, 1943, now Patent No. 2,678,257, issued May 11, 1954, whereby $CO_2$ and $CO$ gases and water vapor are given off incident to the reduction. The uranium dioxide is then reacted with $CCl_4$ in the vapor phase at approximately 450° C. in a suitable reaction chamber, in order to produce crude $UCl_4$, as disclosed in the copending application of James M. Carter, Serial No. 490,293, filed June 10, 1943, now Patent No. 2,677,592, issued May 4, 1954, whereby $COCl_2$, $CO_2$, $CO$ and $Cl_2$ gases are given off incident to the reaction. In accordance with an alternative process, the $UO_3$ may be reacted directly with $CCl_4$ in the liquid phase in an autoclave at a temperature approximately 140° to 160° C. and at a pressure approximately 200 pounds per square inch gauge, in order to produce $UCl_5$, as disclosed in the copending application of Charles J. Carignan and Ernest C. Evers, Serial No. 557,334, filed October 6, 1944, now Patent No. 2,734,795, issued February 14, 1956, whereby $COCl_2$, $CO_2$, $CO$ and $Cl_2$ gases are given off incident to the reaction. The uranium pentachloride thus produced is then calcined or decomposed to produce crude $UCl_4$ by heating to approximately 350° C., whereby $Cl_2$ gas is given off incident to the calcination.

In any case, the crude uranium tetrachloride produced by either of the alternative processes indicated above is then sublimed in a suitable molecular still at approximately 600° C., in order to produce a sublimate of $UCl_4$, whereby residues of $UO_2$ and $UOCl_2$ are produced incident to the sublimation. The residues of $UO_2$ and $UOCl_2$ are ultimately converted to $UCl_4$. The $UCl_4$ thus produced is of very pure form and is suitable for recycling in the appropriate one of the first-stage or second-stage calutrons, in the manner previously explained. More particularly, the conversion of the first batch of $(NH_4)_2U_2O_7$ is productive of a first batch of $UCl_4$ containing uranium of natural or normal composition with reference to $U^{235}$; this first batch of $UCl_4$ is recycled in the first-stage calutron. Also, the conversion of the second batch of $(NH_4)_2U_2O_7$ is productive of a second batch of $UCl_4$ containing uranium singly enriched with $U^{235}$; this second batch of $UCl_4$ is recycled in the second-stage calutron.

Other examples of detailed chemical procedures which may be followed in order to recover uranium from the parts of a calutron upon which it is deposited, to purify the recovered uranium thus eliminating the metal impurities or contaminants, and to reclaim or salvage any uranium carried by the various precipitates and filtrates resulting from purification, are disclosed in the copending applications of Martin D. Kamen, Serial No. 532,160, filed April 21, 1944, now abandoned; Martin D. Kamen et al., Serial No. 542,378, filed June 27, 1944, now Patent No. 2,771,340, issued November 20, 1956; James M. Carter et al., Serial No. 559,624, filed October 10, 1944; Robert Q. Boyer, Serial No. 552,548, filed September 2, 1944, now Patent No. 2,771,339, issued November 20, 1956; Scott B. Kilner, Serial No. 558,954, filed October 16, 1944; Ross Cummings, Serial No. 532,161, filed April 21, 1944, now Patent No. 2,772,142, issued November 27, 1956; and Sam Rosenfeld, Serial No. 567,286, filed December 8, 1944.

In view of the foregoing, it is apparent that there has been provided a process of recovering, reclaiming, purifying and converting uranium, both in metallic and compound forms, in conjunction with the calutron method, whereby uranium enriched with $U^{235}$ may be produced on a large scale in commercial quantities.

Also, it will be understood that the present process may be suitably modified so that a compound of uranium other than $UCl_4$ may be treated either in the first-stage or in the second-stage calutron. For example, the calutron, as well as the conversion steps of the process, may be modified, whereby $UCl_6$, $UBr_4$, etc. may be treated in order to produce uranium enriched with $U^{235}$.

Furthermore, it will be understood that the present process may be further modified in order to accommodate the enrichment of other elements in one or more of their isotopes. For example, potassium may be enriched with respect to the radioactive isotope $K^{40}$, rubidium with respect to the radioactive isotope $Rb^{87}$, or samarium with respect to the radioactive isotope $Sm^{148}$.

Further, it will be understood that the present process contemplates subjecting the element that is to be enriched with respect to a selected one or more of its isotopes to successive calutron treatments until the element contains the desired enrichment of the selected one or more of its isotopes, whereby the process may in fact be carried out in three or the required number of calutrons, arranged in tandem relation.

The term "uranium" is employed in the present specification and claims in a generic sense, i. e., as applying to uranium whether in elemental, combined or ionic form, unless indicated otherwise by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process of recovering uranium values from deposits formed on the parts of a calutron as a result of the processing of $UCl_4$ therein, comprising washing said parts to an aqueous wash solution containing said uranium values together with impurities of a first class including nickel and copper ions which form soluble complex ions in the presence of ammonium hydroxide and impurities of a second class including iron and chromium ions which form insoluble hydroxides in the presence of ammonium hydroxide and mixtures of ammonium hydroxides and ammonium carbonate, treating the wash solution with an oxidizing agent, treating the oxidized wash solution with ammonia to precipitate the uranium values as $(NH_4)_2U_2O_7$ and the metal impurities of the second class as hydroxides away from the metal impurities of the first class remaining as soluble ammonium complex ions in the solution, filtering the solution in order to separate the $(NH_4)_2U_2O_7$ and the metal hydroxide precipitates from the metal impurities of the first class in the filtrate, dissolving the $(NH_4)_2U_2O_7$ and metal hydroxide precipitates in acid, treating the acid solution with ammonia and ammonium carbonate to precipitate the metal impurities of the second class as hydroxides away from the uranium in the solution, and then filtering the solution in order to separate the precipitate of metal hydroxides from the uranium values in the filtrate.

2. The process of reclaiming uranium values from deposits formed in a calutron as a result of processing $UCl_4$ therein, comprising removing said deposits from said calutron, forming an aqueous solution from said deposits, treating said solution with ammonia to precipitate $(NH_4)_2U_2O_7$ therefrom in purified form, calcining said $(NH_4)_2U_2O_7$ to produce $UO_3$, chlorinating said $UO_3$ to produce $UCl_5$, converting said $UCl_5$ into $UCl_4$, and purifying said $UCl_4$ to be recycled in the calutron.

3. The process of recovering uranium values from deposits formed on the parts of a calutron disposed in the source region thereof as a result of the processing of a halide compound of uranium therein, comprising washing said parts with water to form a solution containing said values and metal impurities including copper and nickel ions which form alkaline soluble ammonium complex ions, treating said solution with an oxidizing agent, adding ammonia to precipitate said uranium values, while said impurities remain in solution as ammonium complex ions, separating the uranium values from said solution, calcining said precipitate to produce uranium oxide, and halogenating the oxide to reconstitute said uranium halide compound.

4. The process of recovering uranium values from deposits formed on the parts of a calutron disposed in the source region thereof as a result of processing a uranium halide compound therein, comprising washing said deposits with water to form a solution containing said values and metal impurities including iron and chromium ions which are insoluble in an ammonium carbonate-ammonium hydroxide solution, treating said solution with an oxidizing agent, treating said oxidized solution with ammonia and ammonium carbonate to precipitate said impurities and leave said uranium values in solution, recovering said uranium values from said solution, calcining the uranium values to produce uranium oxide, and halogenating said oxide to reconstitute said uranium halide compound.

5. The process of recovering uranium values from deposits formed on the parts of a calutron, disposed in the source region thereof as a result of processing a uranium halide compound therein, comprising washing said parts with water to form a solution containing said uranium values together with metal impurities including nickel and copper ions which form soluble ammonium complex ions in alkaline solution and impurity ions including iron and chromium which form insoluble hydroxides in mixed ammonium carbonate-ammonium hydroxide and ammonium hydroxide solutions, oxidizing said solution with an agent therefor, adding ammonia to said oxidized solution to precipitate said uranium values and said impurities including iron and chromium insoluble in said solution and away from the copper and nickel impurities remaining as soluble ammonium complex ions in the solution, dissolving said precipitate in acid, treating said solution with ammonia and ammonium carbonate to precipitate said impurities including iron and chromium away from the uranium values remaining in the solution, acidifying the solution containing the uranium values, adding ammonia to said acidified solution to precipitate uranium values therefrom, calcining said precipitate to uranium oxide, and halogenating said oxide to reconstitute said uranium halide compound.

6. The process of recovering uranium values from deposits formed on the collector of a calutron as a result of the processing of a uranium material therein, comprising washing said collector to produce a solution containing said uranium values and copper, oxidizing said solution with an agent therefor, treating said oxidized solution with ammonia to precipitate said uranium values as $(NH_4)_2U_2O_7$, calcining said $(NH_4)_2U_2O_7$ to produce $UO_3$, converting said $UO_3$ to $UCl_4$, and purifying said $UCl_4$.

7. The process of recovering uranium values from deposits formed on the parts of a calutron as a result of the processing of $UCl_4$ therein, comprising washing said parts with an aqueous solvent to form a solution containing said values and impurities including iron and chromium ions which form insoluble hydroxides in the presence of ammonium carbonate and ammonium hydroxide, oxidizing said solution with an agent therefor, treating said oxidized solution with ammonia and ammonium carbonate to precipitate said impurities, and filtering said solution to remove said precipitate and leave said uranium values in solution.

8. The process as in claim 7 with the additional step of adjusting the pH of said oxidized solution to a value of about 2, prior to said precipitation step.

9. The process of recovering uranium values from deposits formed on the parts of a calutron as a result of the processing of a uranium material therein, comprising washing said parts to form an aqueous solution containing said values and impurities including iron and chromium ions which form insoluble hydroxides in the presence of ammonium carbonate and ammonium hydroxide, oxidizing said solution with hydrogen peroxide, treating said oxidized solution with ammonia and ammonium carbonate to precipitate said impurities and leave said uranium values in solution, filtering said solution to remove said precipitate, and adding $HNO_3$ to said filtrate to produce $UO_2(NO_3)_2$ therein.

References Cited in the file of this patent

UNITED STATES PATENTS

| | | |
|---|---|---|
| 1,081,949 | Du Pont | Dec. 23, 1913 |
| 1,461,067 | Moser | July 10, 1923 |
| 1,463,154 | Cummins | July 31, 1923 |

OTHER REFERENCES

Friend: Textbook of Inorganic Chemistry, vol. VII, part III, page 294 (1926), publ. by Charles Griffin & Co., Ltd., London.